United States Patent
Felton, Jr.

[11] Patent Number: 6,125,836
[45] Date of Patent: Oct. 3, 2000

[54] DUAL FUNCTION GRILLING SYSTEM

[76] Inventor: Robert Felton, Jr., 19645 Hanna, Detroit, Mich. 48203

[21] Appl. No.: 09/358,218

[22] Filed: Jul. 20, 1999

Related U.S. Application Data

[60] Provisional application No. 60/093,337, Jul. 20, 1998.

[51] Int. Cl.$^7$ .................................................. A47J 37/00
[52] U.S. Cl. .......................... 126/25 R; 126/8; 126/25 A
[58] Field of Search ................................. 126/9 R, 25 R, 126/25 A, 41 R, 8, 29, 30, 275 R

[56] References Cited

U.S. PATENT DOCUMENTS

| | | | |
|---|---|---|---|
| 2,419,344 | 4/1947 | Eggleston | 126/25 R |
| 2,666,425 | 1/1954 | Hastings, Jr. | 126/25 R |
| 2,902,028 | 9/1959 | Hathorn, Jr. | 126/25 R |
| 3,459,171 | 8/1969 | Swanson | 126/25 R |
| 4,233,890 | 11/1980 | Jansen | 126/25 R |
| 4,996,969 | 3/1991 | Dodgen | 126/25 R |
| 5,183,027 | 2/1993 | Saldana | 126/9 R |
| 5,694,917 | 12/1997 | Giebel et al. | 126/25 R |

Primary Examiner—James C. Yeung
Attorney, Agent, or Firm—Rohm & Monsanto, P.L.C.

[57] ABSTRACT

A multi-functional barbecue grill arrangement which includes a charcoal support rack that enables the grilling arrangement to be used for searing, as well as a conventional barbecue cooking. A barrel-type grilling chamber is supported by a sturdy, A-shaped support frame. A layer of insulating, heat-resistant material, such as cement, lines the lowermost portion of the interior surface of the grilling chamber. Charcoal can be placed on the cement lining and/or on a charcoal support rack disposed above the cement lining, but below one or more food grills. The charcoal support rack, which has a length less than the food grill(s), is translatable on rails to enable the user to position ignited charcoal in close proximity to food on the grilling surface so that the food is seared from the rapid and intense application of heat. Advantageously, the charcoal support rack facilitates ignition of charcoal disposed thereon, by providing a convenient area underneath the charcoal for positioning a flammable item, such as balled-up newspaper. Igniting the newspaper creates a flame which in turn ignites the charcoal. Ignited charcoal on the charcoal support rack can then be used for searing food and/or igniting additional charcoal disposed on the lowermost interior surface for barbecue cooking.

11 Claims, 4 Drawing Sheets

DUAL FUNCTION GRILLING SYSTEM

CROSS-REFERENCE TO RELATED APPLICATIONS

This application claims the benefit of U.S. provisional application Ser. No. 60/093,337 filed on Jul. 20, 1998.

BACKGROUND OF THE INVENTION

1. Field of the Invention

This invention relates generally to charcoal cooking and grilling systems, and more particularly, to a multi-function barbecue grill cooking arrangement that performs improved barbecue style cooking and advantageous searing of food.

2. Description of the Related Art

Conventional grilling arrangements generally are not able to provide a multi-functional approach to barbecue cooking. Such systems generally are specialized in their nature, and are incapable of performing multiple levels of barbecue grilling.

There is a need for an arrangement that employs conventional charcoal fuel and which can effect barbecue-style cooking in conventional and searing modes of operation.

It is, therefore, and object of this invention to provide a barbecue cooking grill that can advantageously be employed in conventional barbecue and searing modes of operation.

It is another object is invention to provide a barbecue cooking grill that can be operated in selectable modes using conventional charcoal fuel.

SUMMARY OF THE INVENTION

The foregoing and other objects are achieved by this invention which provides a multi-functional barbecue grill arrangement which includes a charcoal support rack that enables the grilling arrangement to be used as a searing system. The charcoal support rack is translatable on rails to enable the user to position ignited charcoal in close proximity to food on the grilling surface so that the food is seared from the rapid and intense application of heat. Advantageously, the charcoal support rack, which is positioned above the lowermost interior region of the grilling chamber, where charcoal is normally situated for barbecue grilling, facilitates ignition of charcoal disposed thereon, by providing a convenient area underneath the charcoal for positioning a flammable item, such as balled-up newspaper. Igniting the newspaper, for example, creates a flame which in turn ignites the charcoal. Ignited charcoal on the charcoal support rack can then be used for searing food and/or igniting additional charcoal disposed on the lowermost interior surface.

In accordance with a further aspect of the invention there is provided a multi-functional barbecue grill arrangement having a grilling chamber that, in a particularly preferred embodiment, has an elongated generally cylindrical shape with two opposed ends, such as a barrel. The grilling chamber is supported by a support frame which comprises, in a preferred embodiment, two A-shaped supports affixed to the opposed ends at the exterior of the chamber. The chamber has an openable door for access to the interior of the grilling chamber and a vent for permitting egress of smoke and gases generated by cooking food in the chamber.

Within the interior of the grilling chamber, there is at least one food grill removably mounted in a horizontal position to the interior of the grilling chamber at a first, upper level and extending substantially the length of the grilling chamber. A pair of rails are mounted in the interior of the grilling chamber at a second, lower level and extend lengthwise along the grilling chamber in a spaced apart relationship. In preferred embodiments, the rails are mounted to the opposed ends of the grilling chamber. A charcoal support rack is installed on, and is translatable on the rails. The charcoal support rack is dimensioned to fit on the rails and to have a length less than the food grill so that it can be adjustably positioned beneath food items placed on the food grill.

In a particularly preferred embodiment, a layer of insulating, heat-resistant material, illustratively concrete, lines on the lowermost surface of the grilling chamber. The rails are mounted so that there is a region between the charcoal rack and the surface of the grilling chamber, or its lining, so that flammable materials can be placed in the region to ignite the charcoal.

BRIEF DESCRIPTION OF THE DRAWINGS

Comprehension of the invention is facilitated by reading the following detailed description, in conjunction with the annexed drawing, in which.

DETAILED DESCRIPTION

Figure 1:
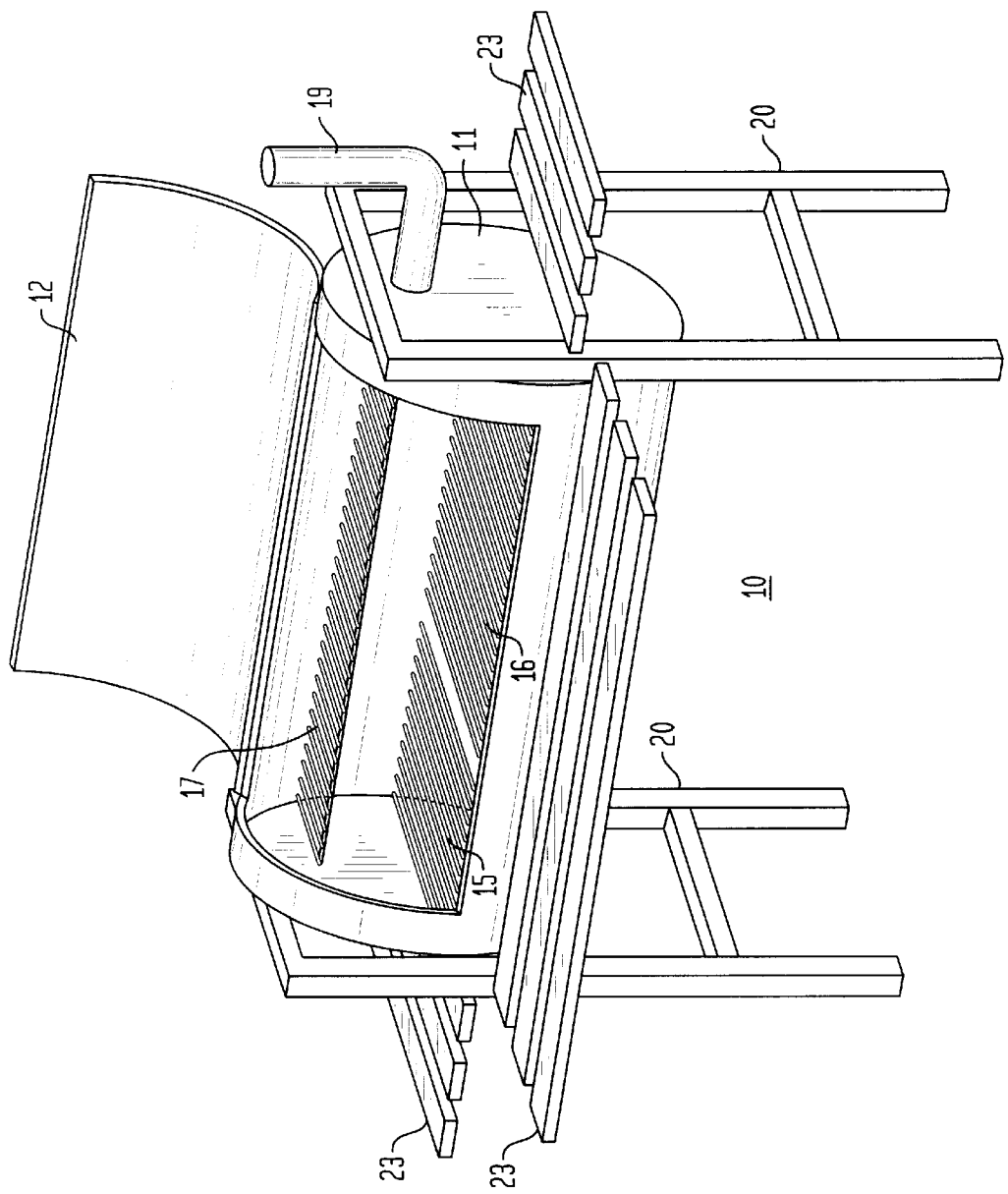
FIG. 1 is an isometric representation of a specific illustrative embodiment of the invention.

FIG. 1 is an isometric representation of a specific illustrative embodiment of the invention. As shown, a grill arrangement 10 has a grilling chamber 11 having an openable door 12. Door 12 is shown in the open position, whereby access is gained to a pair of cooking grills 15 and 16, as well as to a warmer rack 17. In this specific illustrative embodiment of the invention, grilling chamber 11 is installed on a support frame 20 which, in this embodiment, is formed of rectangular steel tubing. In preferred embodiments, the rectangular steel tubing is 1 inch by 1 inch. Rectangular steel tubing 20 is configured as a pair of A-shaped supports that are welded to the exterior of grilling chamber 11. Grilling arrangement 10 is additionally shown to have a plurality of shelves 23 which are conveniently attached to support frame 20. When door 12 is closed, smoke and gases generated during cooking are vented through a vent 19.

Figure 2:
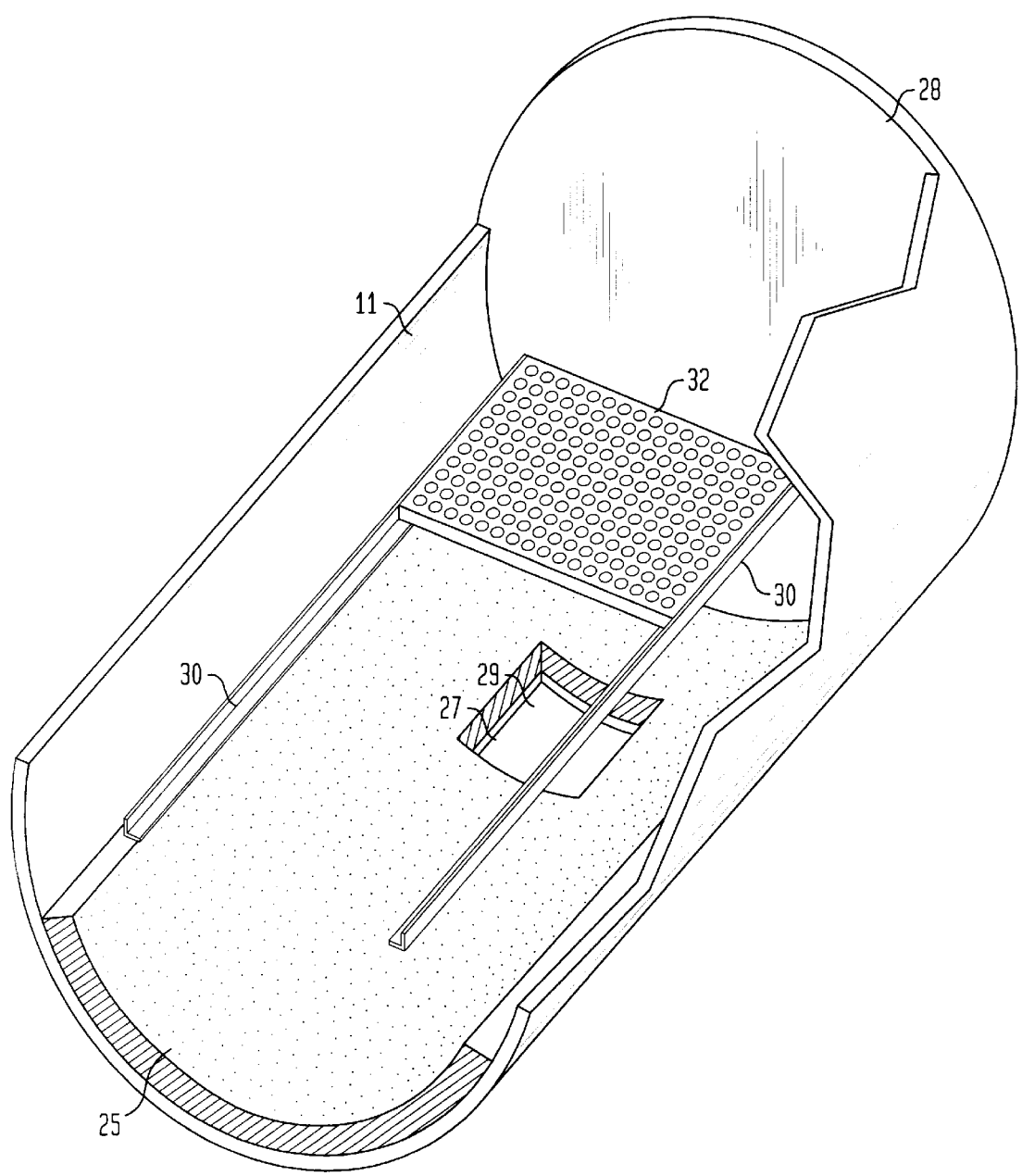
FIG. 2 is a partially cross-sectional, simplified isometric schematic representation of the embodiment of FIG. 1.

FIG. 2 is a partially cross-sectional, simplified isometric schematic representation of the embodiment of FIG. 1. As shown in this figure, the interior of grilling chamber 11 has deposited on its lowermost portion a layer of insulating, heat-resisting material, illustratively in the form of concrete 25. The layer of concrete 25 is substantially uniformly deposited on the interior surface of grilling chamber 11, except for a clean out region 27 at the bottom of the grilling chamber. Clean out region 27 comprises an opening through the bottom of the grilling chamber covered by removable trap door 29. There is additionally shown in FIG. 2 a pair of rails, of tracks 30 which, in this embodiment, are affixed to the end (e.g., end member 28) of the grilling chamber. A charcoal support rack 32 is installed on tracks 30. Charcoal support rack 32 is enabled to be translated along tracks 30.

Figure 3:
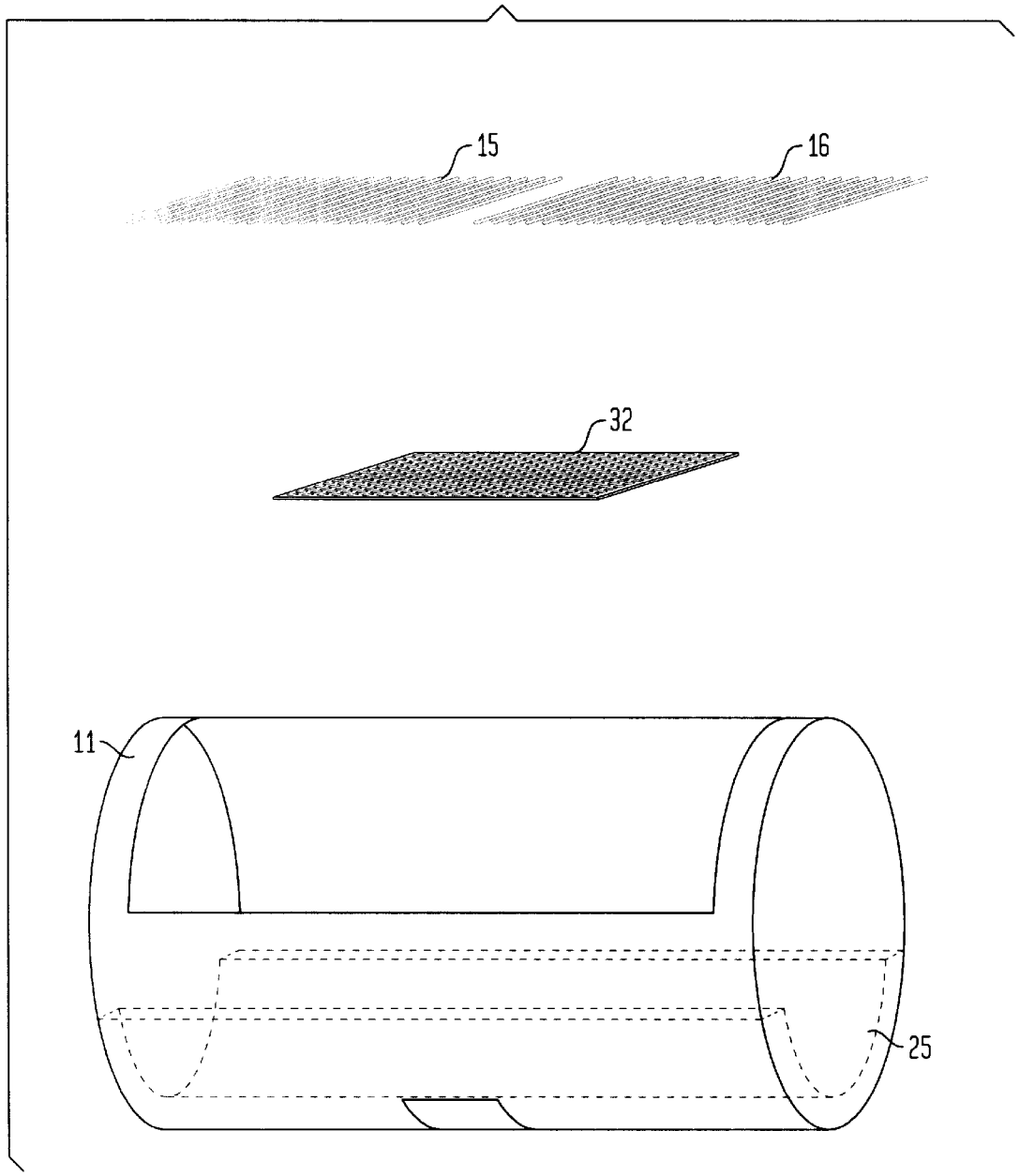
FIG. 3 is a partially cross-sectional, simplified exploded isometric schematic representation of the embodiment of FIG. 1, showing the food grills and a support grill for the searing system.

FIG. 3 is a partially cross-sectional, simplified exploded isometric schematic representation of the embodiment of FIG. 1, showing food grills 15 and 16 and charcoal support rack 32 that enables the grilling arrangement to be used as a searing system, as will be described hereinbelow. In this specific illustrative embodiment of the invention, cooking is achieved on food grills of 15 and 16. However, in other embodiments of the invention, grills 15 and 16 may be replaced by a single grill (not shown). This figure additionally shows that charcoal support rack 32 is smaller than the combined lengths of food grills 15 and 16, and as a shown in FIG. 2, and can be disposed under either of the food grills.

Figure 4:
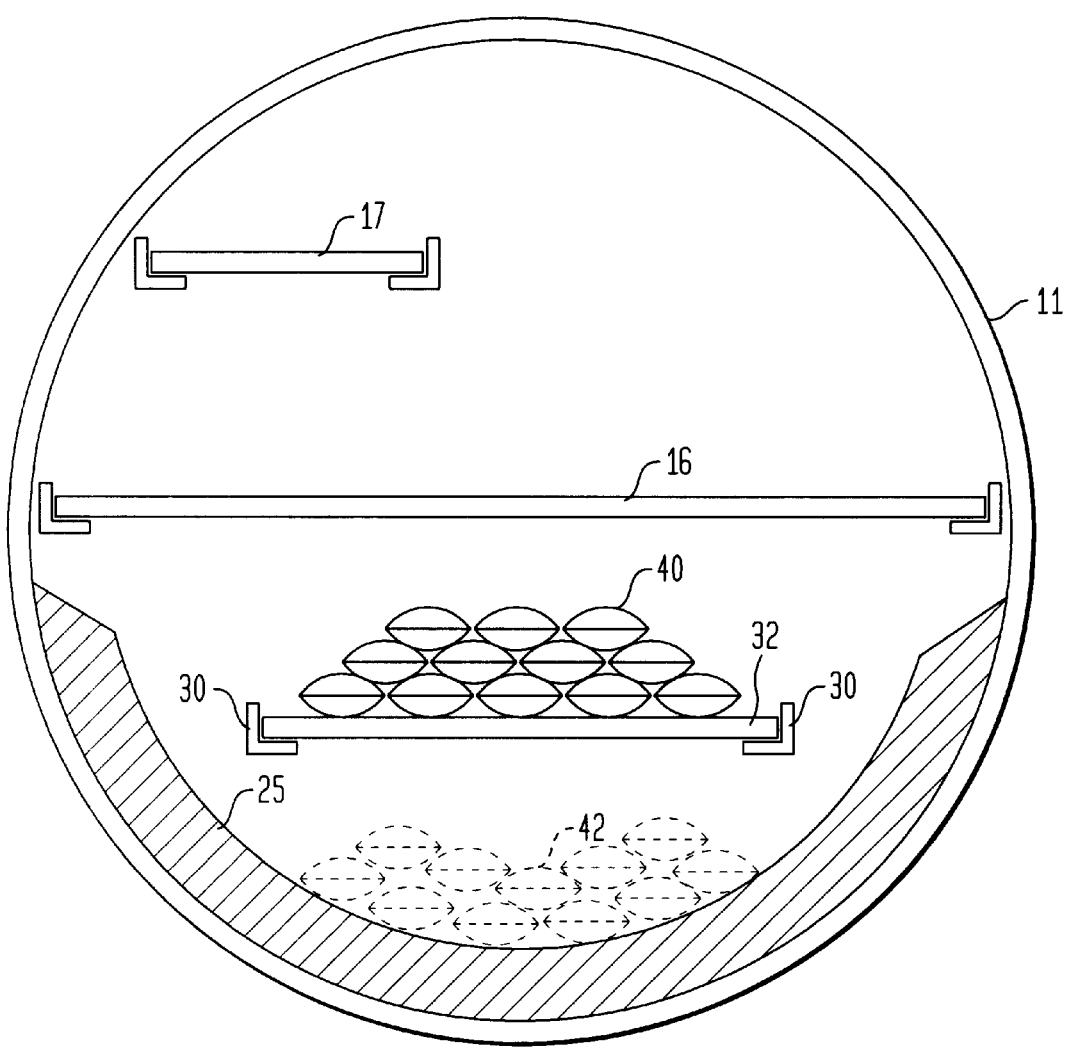
FIG. 4 is a cross-sectional side view of the embodiment of FIG. 1.

FIG. 4 is a cross-sectional side view of the embodiment of FIG. 1, showing charcoal 40 disposed on charcoal support rack 32. In addition, further charcoal 42 is shown disposed on the layer of concrete 25. Elements of structure that have previously been discussed are similarly designated.

As previously indicated, the present invention can be used in a conventional barbecue mode of operation, and/or in a searing mode of operation. More specifically, food (not shown) that is intended to be cooked is placed on food grills 15 and 16. If it is desired to sear the food, charcoal support rack 32 with charcoal 40 disposed thereon is translated so as to be under the food. The proximity of charcoal 40 to the food causes rapid and intense application of heat, whereby the food is seared. More specifically, food that is subjected to such proximity to the charcoal is cooked very rapidly on the outside, but not the inside. Alternatively, food that is intended to be cooked in the conventional barbecue manner, is subjected to the heat that is produced by charcoal 42 situated on concrete layer 25, which is at a greater distance from the food than charcoal 40.

In a practical embodiment of the invention, grilling chamber 11 is formed of metal, illustratively steel, which is highly conductive of heat and subject to rusting. Concrete 25 serves to reduce of the amount of heat that is conducted to the exterior of grilling chamber 11. Additionally, the concrete layer greatly extends the useful life of the grilling chamber. In a specific illustrative embodiment, the grilling chamber comprises a 16 gauge steel barrel and the concrete layer is about 1½ inches thick.

Generally, the placement of charcoal support rack 32 with charcoal 40 thereon immediately over charcoal 42 is not recommended as the resulting heat would be too intense, tending to overcook or burn the food in a short period of time.

It is a further advantage of the invention that there is essentially no need to use charcoal lighter fluid. For example, when using the system of the present invention in a searing mode of operation, charcoal 40 can easily be started by lighting balled or rolled paper (not shown) placed underneath charcoal support rack 32.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A multi-functional barbecue grill arrangement comprising:
    a grilling chamber, the chamber having an elongated generally cylindrical shape with two opposed ends arranged at a first predetermined distance apart;
    a food grill removably mounted in a horizontal position in the interior of the grilling chamber at a first, upper level and extending for a first predetermined length that corresponds substantially to the first predetermined distance between the two opposed ends of said grilling chamber;
    a pair of rails mounted in the interior of the grilling chamber at a second, lower level and extending lengthwise along said grilling chamber substantially for the first predetermined distance of said grilling chamber in a spaced apart relationship;
    a layer of heat-resistant material on a lowermost surface of said grilling chamber for supporting a first portion of a charcoal fuel said layer of heat-resistant material extending for a layer length that corresponds substantially for the first predetermined distance of said grilling chamber;
    a charcoal support rack for supporting a second portion of charcoal fuel, said charcoal support rack being installed on, and arranged to be translatable along, said pair of rails, said charcoal support rack being dimensioned in its width to fit on said pair of rails and in its length to extend for a second predetermined length that is shorter than the first predetermined length of said food grill;
    an openable door in said grilling chamber for facilitating access to the interior of said grilling chamber;
    a support frame for said grilling chamber; and
    a vent in said grilling chamber for permitting egress of smoke and gases.

2. The grill arrangement of claim 1 wherein said grilling chamber is a metal barrel.

3. The grill arrangement of claim 2 wherein the barrel is 16 gauge steel.

4. The grill arrangement of claim 1 wherein said support frame comprises two A-shaped supports that are affixed to the exterior of the opposed ends of said grilling chamber.

5. The grill arrangement of claim 4 wherein said A-shaped supports are formed of rectangular steel tubing.

6. The grill arrangement of claim 5 wherein the rectangular steel tubing is 1 inch by 1 inch.

7. The grill arrangement of claim 1 further comprising a warmer rack mounted to the interior of said grilling chamber at a third level which is higher than the first, upper level, said warmer rack having a width which is narrower than the width of said food grill.

8. The grill arrangement of claim 1 further comprising a clean out region at the bottom of said grilling chamber for facilitating removal of burnt charcoal.

9. The grill arrangement of claim 8 wherein said clean out region comprises an opening through the bottom of said grilling chamber and a removable covering therefor.

10. The grill arrangement of claim 1 wherein said layer of heat-resistant material comprises a layer of insulating material on the lowermost surface of the grilling chamber.

11. The grill arrangement of claim 10 wherein the insulating, heat-resistant material is concrete.

* * * * *